April 17, 1934.   A. E. OSBORN   1,955,085
TUNING INDICATOR
Filed Sept. 12, 1931   3 Sheets-Sheet 1
*Fig. 1*   *Fig. 2*
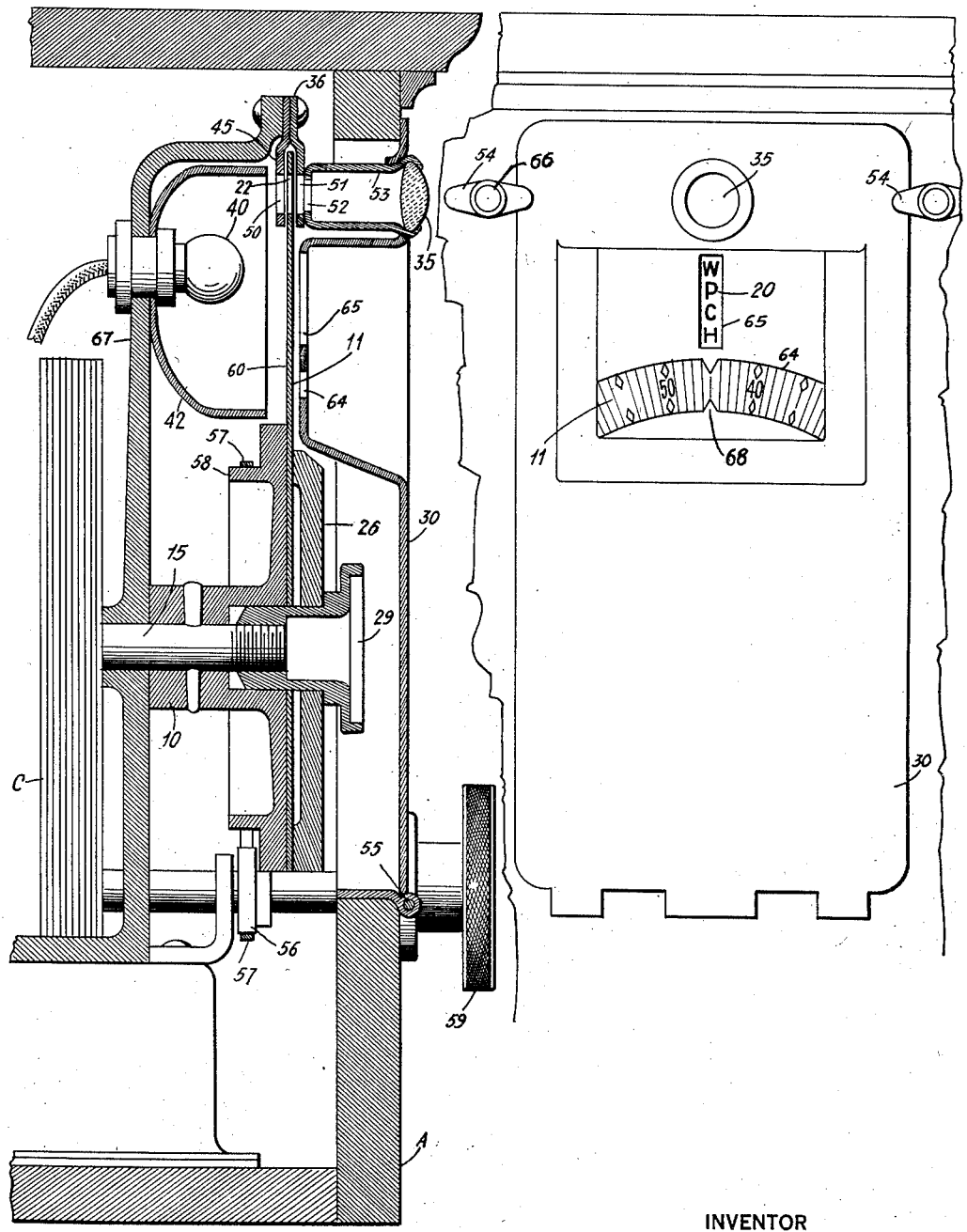
INVENTOR
A. E. OSBORN
BY
ATTORNEY April 17, 1934.  A. E. OSBORN  1,955,085
TUNING INDICATOR
Filed Sept. 12, 1931  3 Sheets-Sheet 2
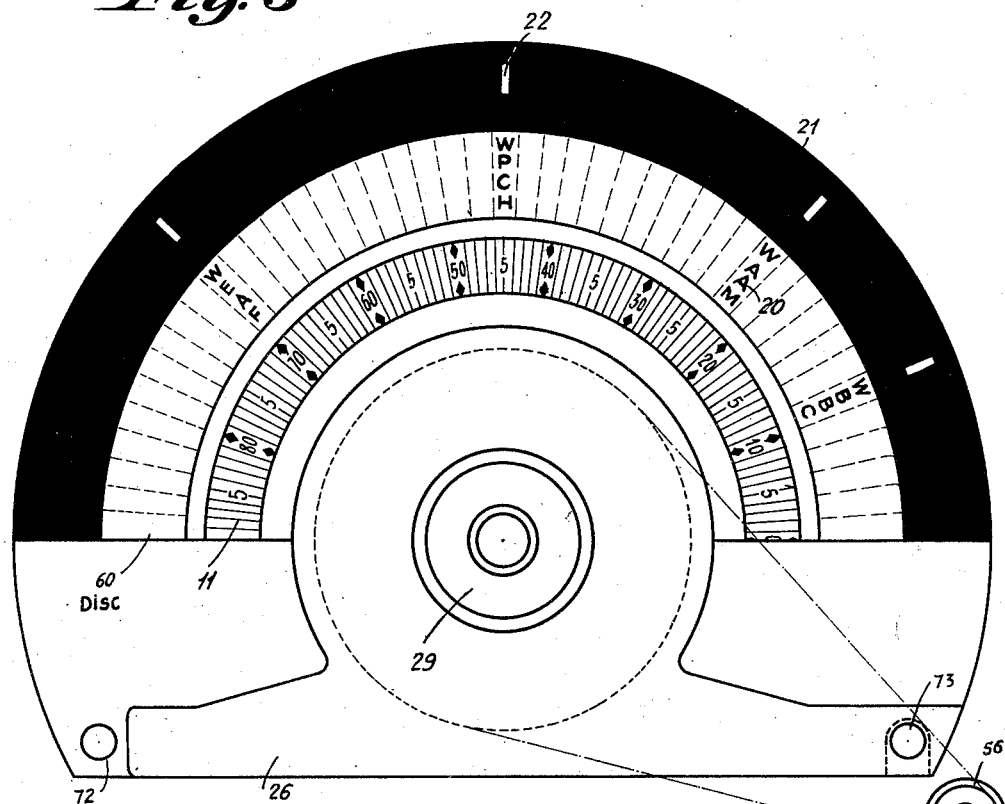
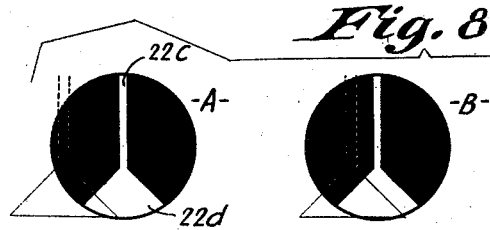
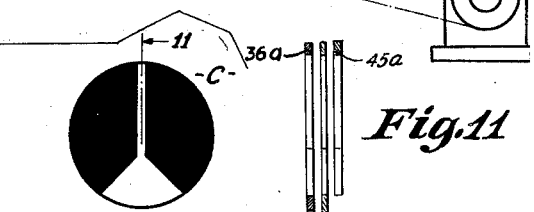
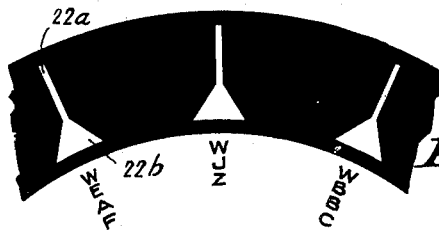
INVENTOR
A. E. OSBORN
BY
ATTORNEY April 17, 1934.  A. E. OSBORN  1,955,085
TUNING INDICATOR
Filed Sept. 12, 1931   3 Sheets-Sheet 3
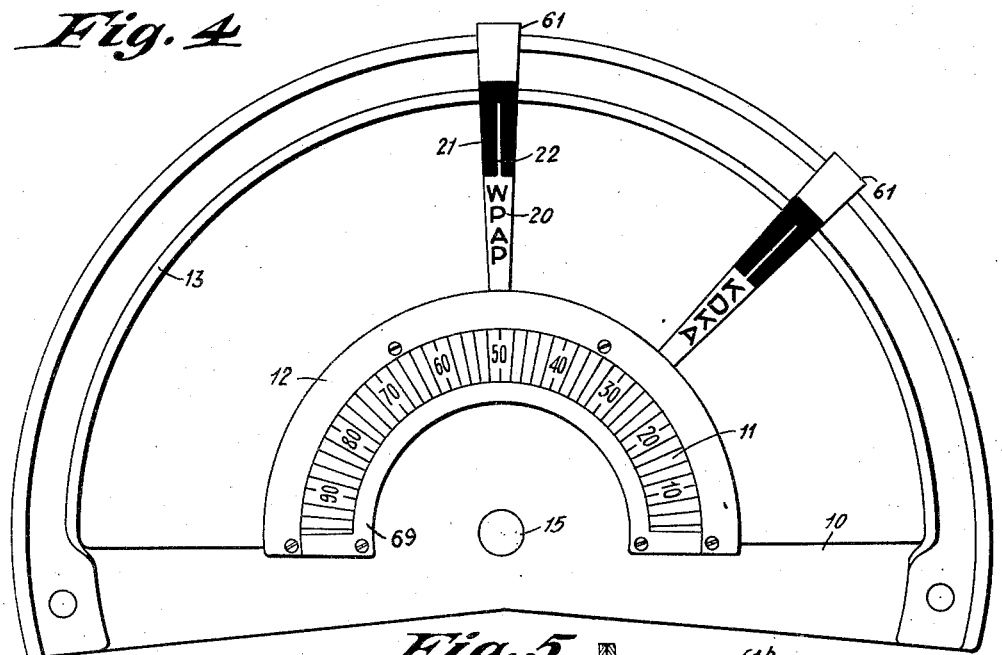
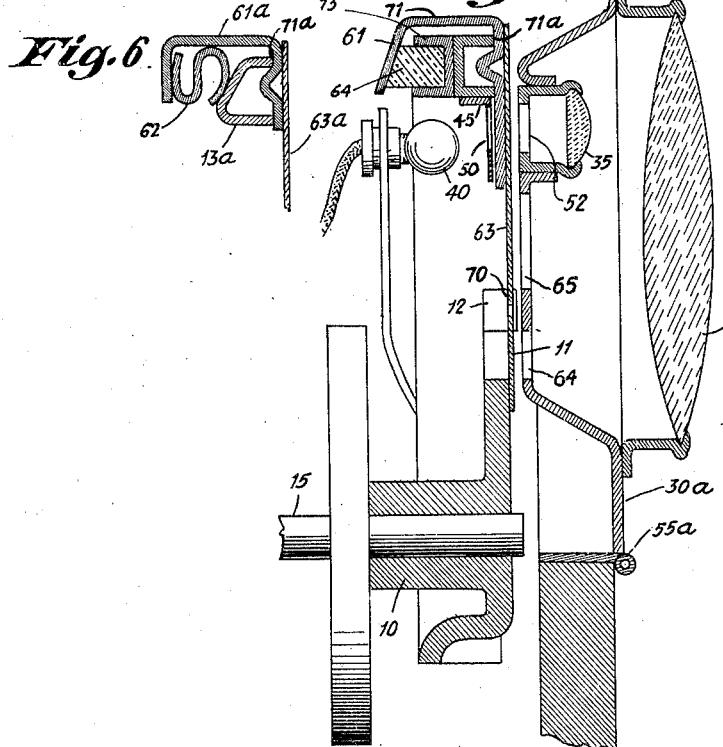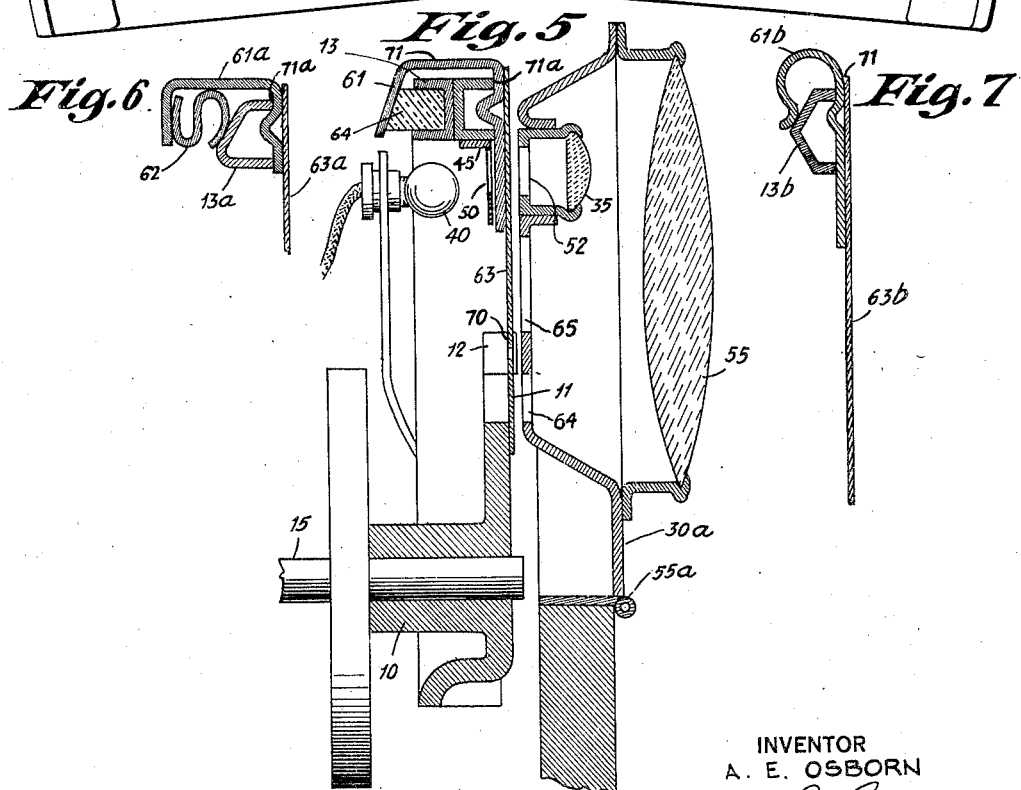
INVENTOR
A. E. OSBORN
BY
ATTORNEY Patented Apr. 17, 1934

1,955,085

UNITED STATES PATENT OFFICE 1,955,085

TUNING INDICATOR

Alden Emerson Osborn, New York, N. Y., assignor to Radio Corporation of America, a corporation of Delaware Application September 12, 1931, Serial No. 562,484

11 Claims. (Cl. 116—124.4)

This invention relates to tuning indicators or tuning devices and has particular reference to such indicators as used for tuning radio receiving sets. Among the objects of the invention is to provide a means for facilitating the adjustment of the dial mechanism or tuning means of the receiver in such a manner that the readjustment for the same station may be easily effected thereafter.

A further object is to provide a novel arrangement whereby certain parts of the dial mechanism are lighted up when the desired station is tuned in. A further object of the invention is to provide an indicating device having three different indicating means to denote when a desired station is tuned in. A still further object of the invention is to provide an indicating mechanism which is adaptable to be used with radio receivers now on the market without making any substantial changes therein, which is simple in construction and inexpensive to manufacture.

With the foregoing and other objects in view the invention consists in the arrangement and combination of parts hereinafter described and claimed and while the invention is not restricted to the exact details of constructions disclosed or suggested therein, yet for the purpose of illustrating the invention practical embodiments thereof are shown in the accompanying drawings in which like reference characters designate corresponding parts in the several views and in which, Fig. 1 is a cross-section showing my tuning indicator arranged on the usual condenser shaft of a radio receiver;

Fig. 2 is a front view of a portion of the indicator shown in Fig. 1;

Fig. 3 is a front view of the dial and its associated parts shown in Fig. 1;

Fig. 4 is a front view of the dial of the station indicator shown in Fig. 5;

Fig. 5 is a cross-section of a modified form of my tuning indicator;

Fig. 6 is a cross-section of a modified form of station indicator for use with the device of Fig. 5;

Fig. 7 is a second modified form of station indicator;

Figs. 8 and 9 are modified forms of a portion of the dial arrangement of Fig. 1;

Fig. 10 is a modified form of the station indicator shown in Fig. 4; and,

Fig. 11 is a section on line 11, 11 of Fig. 8.

Referring to Figs. 1, 2 and 3 I show the panel A of the usual radio receiving set which includes condenser plates C mounted on a rotatable shaft 15 for tuning in any desired station. I preferably mount on one end of the condenser shaft 15 a supporting member 10 which has a pulley 58 formed thereon, a belt 57 passing partially around said pulley and being driven by a smaller pulley 56 which may be operated by the usual tuning knob 59. Held against the front face of member 10 is a dial 60, said dial being retained in position by means of a clamping or securing plate 26 held in position by nut 29. The dial 60 is preferably made of a light, translucent or transparent material such as treated paper or cardboard, celluloid, transparent bakelite or similar material. As shown, the dial has a graduated scale 11 marked thereon. To the rear of the dial is mounted on a supporting standard 67 a pilot light 40 supplied with electric current from a source not shown, and a reflector 42. Also mounted on the upper end of the supporting standard 67 is a depending arm 36 having a long, narrow, vertical slit 51 therein and on the same standard to the rear of the dial a similar depending slitted arm 45. Carried by panel A in front of the described dial mechanism is an escutcheon plate 30 shown pivoted on a pin 55 and retained in position by two lugs 54 pivoted on screws 66. Said plate 30 has three window openings therein in the upper of which a lens tube 53, carrying a suitable lens 35 may be inserted. The lower window openings in plate 30 are denoted 65 and 64, and are shaped as shown. The lens tube 53 has an opening 52 at its rear end which opening may be a vertical slit somewhat wider than the slits 50 and 51 or if desired may be a circular aperture.

In the operation of the device when knob 59 is rotated condenser plates C will be slowly rotated by means of pulleys 56, 58 and belt 57. When a desired station has been tuned in as evidenced by the operation of a loudspeaker or tuning meter (not shown) the station designating letters 20 of said station may be inscribed on the surface of dial 60 preferably by opaque ink or similar material. Without moving the dial an elongated narrow punch corresponding in size to apertures 50 and 51 may be inserted in aperture 51 and forced through the dial thereby cutting a corresponding narrow aperture 22 in its outer portion 21, which portion may be formed of opaque material or of material corresponding to the remaining portion of the dial but having an opaque coating applied thereto. If an opaque coating is used, instead of punching out the slit 22 a suitable tool may be inserted into the slot 51 and the coating scraped off the front surface of the dial thereby forming a translucent or transparent line in the otherwise opaque surface. In either event, after this operation has been carried out, slit 22 will be in alignment with the two slits 50 and 51 whereby an elongated beam of light will be visible to the operator of the receiver stationed in front thereof. As shown, a stationary index 68 is carried by the plate 30 whereby the reading of the graduated scale 11 may be taken. By the arrangement described I provide three different means each of which is lit up by the single light 40 to indicate the tuning in of a desired station, namely, the index reading on scale 11, the appearance of the station indicating letters 20 and the flash of light through lens 35. Tuning knob 59 may next be rotated to tune in any other desired station in the manner just described, the appropriate station designating letters 20 being marked on the dial face and slot 22 cut therein in the proper dial position. Any desired number of stations may be correspondingly marked on the dial. If it is not desired to mark the station letters 20 on the dial while it is still in position, escutcheon plate 30 may be lowered down, nut 29 removed and clamping plate 26 and dial 60 removed through the opening in the panel A, after which the station letters may be marked upon the dial surface. By my structural arrangement I, therefore, may very easily remove the parts of the tuning indicator from the radio receiver without disturbing any other parts of the same. While I prefer to use the lens 35 to magnify the beam of light which indicates the tuning in of a station the use of this lens is not essential to the practice of my invention.

While I have indicated the radio receiver as having the variable tuning means C in the form of a condenser, I may use any other desired tuning means such as a variable inductor. Also while I have described the invention as applied to a radio receiver it may be used in a radio transmitter or any other device having a circuit which is tunable over a wide range of frequencies, the several indicators described above indicating to the observer when the circuit has a desired resonant frequency.

The general arrangement of the device shown in Figs. 4 and 5 is similar to that shown in Figs. 1 and 2. In this case the supporting member 10 has a hub portion 69 and an annular ring 12 between which the graduated dial 11 of transparent or translucent material is mounted. The dial support 10 carries a ring-shaped channel member 13 of generally semi-circular form. Adjustable station designating plates 71 are formed of a metallic clamping member 61 which press against a rubber ring 64 seated in a groove in the rear of the channel member 13 whereby the rear surfaces 71a of plates 71 are held in alignment against the front edges of the channel member as shown in Fig. 5 and thereby the plates held in a correct radial position. Each plate 71 carries a flat transparent portion 63 on which the station letters 20 may be marked. Above this portion is a black or opaque portion 21 on which portion may be scratched a transparent line 22 or the line 22 may be formed as a slot cut through the plate. As in Fig. 1 an electric lamp 40 is mounted behind the dial device. The lower end of the plates 71 may be further kept in alignment by being seated in a slot 70 formed in the member 12. An escutcheon plate 30a may be used as in Fig. 1 having the window openings 64, 65 and 52. As shown in Fig. 5 a large lens 55 may be mounted on the cover plate through which all the window openings may be seen. Fig. 6 shows a modified construction for retaining plates 71 in their adjusted and correct positions. In this form the rear surface 71a of the plate are held against the front surface of the channel member 13a by means of an S-shaped spring 62 as shown. Fig. 7 shows a further modification for retaining plates 71 in position, the upper portion of the plate 61b being made of spring brass or similar resilient material and pressing against the rear surface of the channel member 13b.

In operation the condenser shaft 15 is rotated in the same manner as shown in Fig. 1 until the desired station is tuned in, the corresponding station letters having already been marked on a plate 71. This plate is now adjusted by moving it angularly on channel member 13 until slot 22 is in alignment with slot 50 in which position the lens 35 will be strongly illuminated or if no lens is used a vertical beam of light will be seen. If the indicator is moved away from this position it will be noted that the scale graduations 11 and the station letters 20 will still be visible by means of the illumination from lamp 40. As the same station is again tuned in, when the edge of the opaque portion 21 overlies slit 50 the lens 35 will appear dark and no light will be seen in it until the indicator has been turned to bring slot 22 in alignment with slot 50 at which instant lens 35 will again be highly illuminated thereby indicating that the desired station has been tuned in. It will be further understood that a separate station designating plate 71 will be used for each desired station and will be adjusted to its correct position on the channel member 13 in the manner previously described. It will be also understood that the use of the lenses 35 and 55 is not essential to the practice of my invention, as the flashes of light may be seen directly by the observer instead of through these lenses.

In the modification of Fig. 1 shown in Figs. 8, 9 and 11 the transparent portions 22 of disc 21 are formed as shown in Fig. 9 as having a straight narrow radial portion 22a and a triangular shaped base portion 22b. The plates 36a and 45a are formed with correspondingly shaped portions in alignment with each other. As the disc 60a is rotated, when a tuning position adjacent that of a desired station is approached one corner of the triangular portion 22b in the disc overlaps one corner of the triangular portion 22d of the plates 36a and 45a, as shown at A in Fig. 8. In this position a small amount of light will pass the overlapping transparent portions causing a very small illumination of lens 35. It will be noted that in this position the station letters are not visible nor is any light visible through the radial slot 22a. As the indicator is turned further the overlapping triangular areas will increase as shown at B in Fig. 8 and the station letters will commence to appear behind the window opening, but no light is visible through the slot 22a. When the correct tuning position has been reached as indicated at C in Fig. 8 a vertical flash of light will appear through the slot 22a and the lens 35 will be fully illuminated. This embodiment of the invention has the advantage that the observer has warning that the desired station position is being approached by the increasing amount of illumination seen in lens 35, at the same time the exact tuning position is clearly indicated with precision when the vertical beam of light is seen in the lens and the station letters are in full view.

As shown in Fig. 10 the adjustable station designating plates 71 shown in Fig. 4 may be made having transparent portions 22e and 22f of the same shape as those described in Fig. 8, in which case the corresponding shaped slits 50 and 52 will be used. In this case also the approach to a desired tuning position will be indicated by a gradually increasing illumination of the lens 35 and when the exact tuning position is reached the vertical beam of light through slit 22e will be plainly visible. It will be understood that the triangular portions 22b and 22f may be made semi-circular or of other desired shapes.

It will be evident that other modifications of my invention may be made without departing from the scope of the appended claims.

What I desire to secure by Letters Patent is:

1. In combination in an indicating device, a tuning device to be adjusted, a dial carrier connected with said device, a plurality of plates adjustably carried by said dial carrier, each of said plates having a translucent portion on which station designating indicia may be marked and an opaque portion surrounding a translucent line and a source of light mounted behind said dial, the light passing through said line serving to indicate the correct tuning position of said device.

2. In combination in an indicating device, a tuning device, a dial carrier connected to move with said device, station designating plates adjustably carried by said carrier, each of said plates having an inscribable translucent portion on which station letters may be marked, and means for retaining said plates in radial position on said dial carrier.

3. In combination in an indicator, a dial carrier, a station designating plate adjustably carried by said carrier, said plate having an inscribable portion on which station letters may be marked and a second portion adapted to pass a beam of light at a predetermined position of said carrier.

4. In combination in an indicator, an adjustable dial carrier, a station designating plate carried by said carrier, said plate having an elongated translucent portion bordered by an opaque portion, a light source mounted behind said dial carrier and a lens mounted in front thereof, whereby when said dial carrier is adjusted to a predetermined position an enlarged image of the translucent portion of said plate is visible in said lens.

5. In combination in a tuning indicator, tuning means, a member connected to said tuning means and having an aperture therein, a light source mounted behind said member, a stationary member having an aperture therein, said apertures being elongated and so shaped that the one in the stationary member is illuminated with increasing intensity during the time the tuning position of said means is being approached and when the exact tuning position is reached the degree of illumination of said aperture is suddenly increased in amount.

6. In an indicating device, a dial having an opaque annular portion and a plurality of translucent portions surrounded by said opaque portion, each of said translucent portions having an elongated straight section terminating in a tapering, enlarged base section.

7. In combination in an indicator, a tuning means, a dial connected to said means, a light source behind said dial said dial having a two sectioned aperture therein and means whereby one section only of said aperture is illuminated as the tuning position of said tuning means is approached and the second section of said aperture is suddenly illuminated when the correct tuning position is reached.

8. In an indicating device of the class described, a device to be adjusted, a dial carrier connected with said device, at least two plates adjustably carried by said dial carrier, each of said plates having an inscribable portion on which station letters may be marked and a translucent portion bounded by an opaque portion, and a source of light mounted behind said dial, the light passing through said translucent portion serving to indicate the correct adjustment of said device.

9. In combination in an indicating device, a panel member having an aperture therein, a tuning device to be adjusted mounted behind said panel member, a dial member mounted behind said panel member and connected to move as said device is adjusted, a light source mounted behind said dial member and a lens mounted in front of the aperture in said panel, said dial member having at least two separated translucent areas each of which is so positioned on said dial member that a beam of light of substantial area passes through it and illuminates said lens when said device has been adjusted to correct tuning position, and means mounted in front of said panel member and mechanically connected to said tuning device for adjusting it.

10. In a radio receiver including variable tuning apparatus the combination of an indicator movable as the tuning apparatus is varied, means for rendering visible at least a portion of said indicator, a source of light, and means including a member adjustably secured to said indicator for permitting light from said source to illuminate a visible portion of said indicator at the position of said tuning apparatus when the receiver is tuned in a predetermined desired manner.

11. In a radio receiver including variable tuning apparatus the combination of a member movable as the tuning apparatus is varied, means for rendering visible portions of said member, station designating markings arranged on said member so as to be visible, a light source, and a plurality of means adjustably secured to said member for providing visible rays from said light source at any of the predetermined positions of said apparatus at which the receiver is tuned in a predetermined manner.

ALDEN EMERSON OSBORN.